(12) United States Patent
Leni et al.

(10) Patent No.: US 6,498,912 B1
(45) Date of Patent: Dec. 24, 2002

(54) JOB-BASED ACCOUNTING METHOD AND APPARATUS FOR IMAGE PROCESSING

(75) Inventors: Therese F. Leni, West Henrietta, NY (US); Marina Maymin, Rochester, NY (US); David L. Salgado, Victor, NY (US)

(73) Assignee: Xerox Corporation, Stamford, CT (US)

( * ) Notice: Subject to any disclaimer, the term of this patent is extended or adjusted under 35 U.S.C. 154(b) by 147 days.

(21) Appl. No.: 09/669,242

(22) Filed: Sep. 25, 2000

(51) Int. Cl.⁷ .............................. G03G 21/02
(52) U.S. Cl. ............................. 399/79; 399/1
(58) Field of Search ...................... 399/1, 2, 8, 75, 399/79, 80, 81, 82

(56) References Cited

U.S. PATENT DOCUMENTS

| | | | |
|---|---|---|---|
| 5,146,344 A | * | 9/1992 | Bennett et al. ............. 399/1 X |
| 5,383,129 A | * | 1/1995 | Farrell ...................... 399/79 X |
| 5,815,764 A | * | 9/1998 | Tomory ........................ 399/1 |
| 5,903,801 A | * | 5/1999 | Nakamura ................... 399/79 |
| 6,026,380 A | * | 2/2000 | Weiler et al. .............. 399/8 X |
| 6,052,547 A | * | 4/2000 | Cuzzo et al. ................. 399/79 |

* cited by examiner

Primary Examiner—Sandra Brase
(74) Attorney, Agent, or Firm—Fay, Sharpe, Fagan, Minnich & McKee, LLP

(57) ABSTRACT

A job-based accounting system for image processing includes receiving an image processing job at a multifunction image processing apparatus from a walk-up user or a computer workstation operably connected to the image processing apparatus. The image processing job is classified as one of: (i) a print job submitted from a computer workstation operably connected to the image processing apparatus; (ii) a copy job submitted by a walk-up user of the image processing apparatus; (iii) a scan job submitted by a walk-up user of the image processing apparatus; and (iv) a facsimile job submitted or received by a user of the image processing apparatus. One of a plurality of different accounting modes is selected to be used by the multifunction device when the multifunction device carries out the image processing job based upon the classification of the image processing job. The image processing job is completed and accounting data are developed in accordance with the selected one of the plurality of different accounting modes.

8 Claims, 7 Drawing Sheets

JOB-BASED ACCOUNTING METHOD AND APPARATUS FOR IMAGE PROCESSING

BACKGROUND OF THE INVENTION

The present invention relates generally to image processing methods and apparatus. More particularly, the present invention relates to an image processing method and apparatus including job-based accounting capabilities, whereby an administrator of the image processing apparatus can select one of several available accounting modes depending upon the particular accounting required for an image processing installation.

In legal, educational, and other environments, it is common to equip xerographic copiers with internal or external means adapted for preventing unauthorized machine use while also accounting for authorized machine use. In one common application, an external keypad/display unit is connected to the copier, and a user must input a code against which copier use, in terms of number of copies only, is tracked. The code and associated sheet count value are stored in the external device as accounting data for later downloading into an associated accounting software program.

This conventional approach to controlling and tracking use of an image processing apparatus has been found to be sub-optimal in many respects. For example, it does not allow an administrator to track use of and/or charge different amounts for particular types of image recording media, e.g., plain stock, bond, transparencies, drill, etc. Furthermore, with this conventional system, the administrator is not able to track use of and/or charge different amounts when the user takes advantage of specialized features of the copier, e.g., color copies, stapling, two-sided copies, and the like.

The foregoing deficiencies are compounded when an administrator attempts to use a conventional accounting system to control access to and track use of a multifunction image processing device (MFD) connected to a computer network. MFD's are adapted to perform multiple image processing operations, e.g., copying documents, printing original computer-generated documents, scanning documents to convert same to digital data, and faxing documents. With MFD's, an administrator may wish to prevent unauthorized walk-up use, e.g., for making copies, but may also desire that networked workstation users not be encumbered with entering additional usernames/passwords for print jobs when these users are known to be authorized due to the fact that they have already logged in to the network. Furthermore, the administrator may desire to track exactly which features or resources of the MFD have been utilized by an authorized user in order to charge the user or his/her department or client accordingly. An accounting system that simply allows or prevents access and that simply counts sheets printed/scanned/faxed is deficient for these operations.

In light of the foregoing specifically noted deficiencies and others associated with conventional accounting methods/apparatus for image processing applications, it has been deemed desirable to develop a novel and nonobvious job-based accounting method and apparatus for image processing.

SUMMARY OF THE INVENTION

In accordance with the present invention, a job-based accounting method for image processing includes receiving an image processing job at a multifunction image processing apparatus from one of a walk-up user and a computer workstation operably connected to said image processing apparatus. The image processing job is classified as one of: (i) a print job submitted from said computer workstation operably connected to said image processing apparatus; (ii) a copy job submitted by said walk-up user of said image processing apparatus; (iii) a scan job submitted by said walk-up user of said image processing apparatus; and (iv) a facsimile job one of submitted and received by said user of said image processing apparatus. One of a plurality of different accounting modes is selected to be used by said multifunction device when said multifunction device implements said image processing job based upon said classification of said image processing job. The image processing job is completed and accounting data are developed in accordance with said selected one of said plurality of different accounting modes.

In accordance with another aspect of the invention, an image processing system includes a computer network and a multifunction image processing apparatus (MFD) connected to said computer network. The MFD is adapted for performing a plurality of different image processing tasks including copying documents, scanning documents, faxing documents, and printing documents. The MFD comprises an accounting system adapted to track image processing jobs performed by the multifunction image processing apparatus according to a plurality of different accounting modes. The apparatus also includes a user interface operably connected to said multifunction image processing apparatus. The user interface is adapted for receiving an accounting identifier input by a user and transmitting the received accounting identifier to the multifunction image processing apparatus. At least one user workstation is connected to the computer network. The user workstation is adapted for submitting at least print jobs to the multifunction image processing apparatus. An external accounting system is also connected to the computer network and is adapted to receive accounting data, including the accounting identifier, from the multifunction image processing apparatus for each image processing job performed by the multifunction image processing apparatus and to save said received accounting data.

In accordance with another aspect of the present invention, an accounting method for image processing comprises receiving, into an image processing apparatus, input from an administrator that specifies a plurality of different accounting modes for a respective plurality of image processing functions performable by said image processing apparatus. A request for an image processing function is received from a user of the image processing apparatus. Based upon the administrator input, one of said plurality of different accounting modes is selected and associated with said request. The image processing function is performed, and the image processing function is accounted for according to said selected one of said plurality of accounting modes.

One advantage of the present invention resides in the provision of a novel and nonobvious job-based accounting method and apparatus for image processing.

Another advantage of the present invention is found in a job-based accounting system specifically adapted for use in connection with networked MFD's.

Still another advantage of the present invention resides in the provision of a job-based accounting system that includes multiple pre-defined accounting modes, and where an administrator is able to select the mode, on a machine-by-machine basis, that is most appropriate for the administrator's accounting goals.

A further advantage of the present invention is found in the provision of a job-based accounting system for image processing wherein at least five different pre-defined modes—a secure accounting mode, a resource accounting mode, an authentication disabled accounting mode, a custom accounting mode, and a disabled accounting mode—are provided and available for selection by an administrator as deemed necessary and appropriate.

Yet another advantage of the present invention resides in the provision of a job-based accounting system for image processing in a multifunction device wherein one of several different pre-defined accounting modes are employed depending upon the particular type of image processing job to be carried out.

Still other benefits and advantages of the present invention will become apparent to those possessed of ordinary skill in the art to which the invention pertains upon reading and understanding the following specification.

BRIEF DESCRIPTION OF THE DRAWINGS

The present invention comprises a variety of components and arrangements of components, and a variety of steps and arrangements of steps, preferred embodiments of which are disclosed herein with reference to the accompanying drawings that form a part hereof and wherein.

DETAILED DESCRIPTION OF PREFERRED EMBODIMENTS

Figure 1:
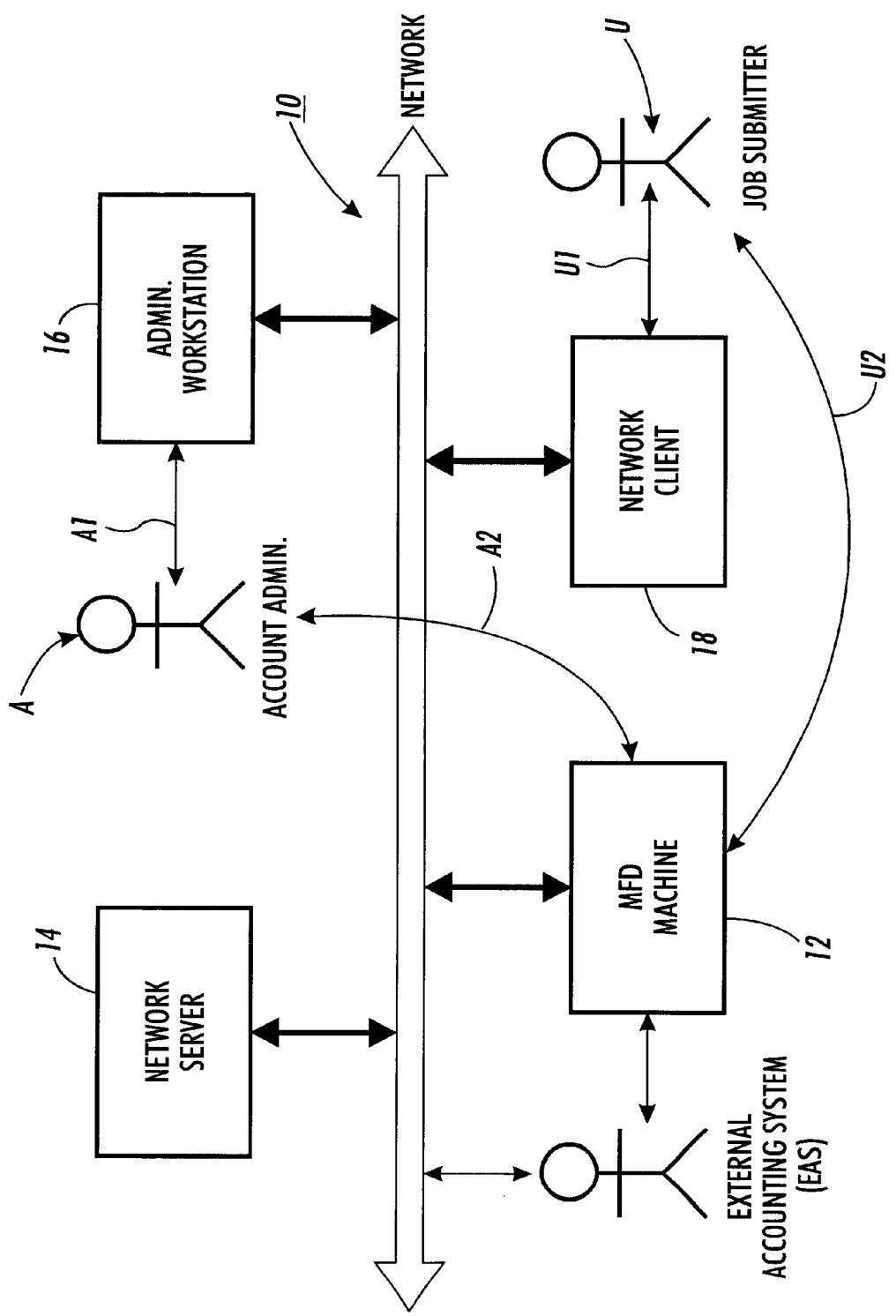
FIG. 1 is a diagram that illustrates an image processing computer network including a job-based accounting system for image processing in accordance with the present invention.

Referring now to the drawings, wherein the showings are for purposes of illustrating preferred embodiments of the invention only and not for purposes of limiting same, FIG. 1 illustrates an image processing computer network 10 including a job-based accounting system for image processing in accordance with the present invention. An image processing apparatus 12 is connected to the network 10. As described herein, the image processing apparatus 12 is a multi-function device (MFD) capable of copying documents, printing computer-generated documents, scanning documents, and faxing documents, and is available commercially from, for example, Xerox Corporation. However, those of ordinary skill in the art will recognize that the image processing apparatus can also be a conventional light-lens copier, a digital black-and-white or color copier, or any other suitable image processing apparatus. The network 10 is controlled by a network server 14. An administrator A interfaces with the network 10 by way of an administration computer workstation 16, and one or more users U interface with the network by way of a network computer client 18. An external accounting system (EAS), comprising a PC or other computer system, is connected to the network and comprises a client application that performs accounting tasks with accounting data gathered from the MFD apparatus 12.

Figure 2:
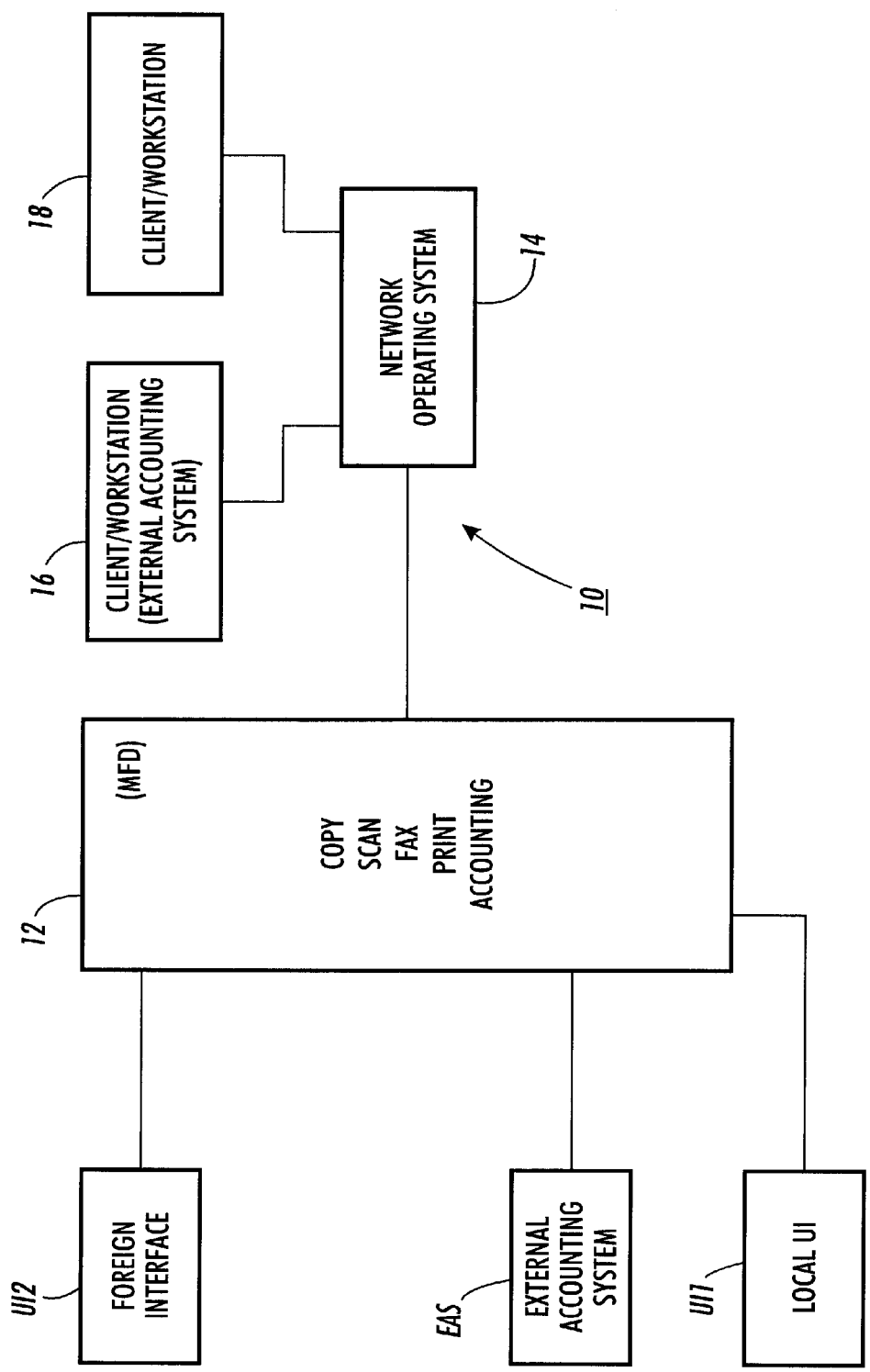
FIG. 2 is a more detailed diagrammatic illustration of the image processing network shown in FIG. 1.

FIG. 2 illustrates additional details of the image processing network shown in FIG. 1. Among numerous other capabilities, the multi-function device (MFD) 12 includes copying, printing, scanning, and faxing resources or capabilities, as well as accounting capabilities as described herein. The copying, printing, scanning, and faxing capabilities are conventional in all respects. To implement the accounting capabilities, the MFD apparatus 12 includes means, such as a microprocessor or other data processing means, for tracking its use in terms of operations performed (copying, printing, fax send, fax receive, scanning), recording media types/sizes (e.g., plain stock, bond, legal size, A4, transparencies) use of color capabilities, duplex printing, use of finishing features (e.g., collating, stapling, etc.), and all other operations performed by the MFD apparatus 12.

The MFD apparatus 12 preferably further comprises a local user interface UI1, such as a touch-screen display or separate keypad and display. In additional or as an alternative to the local user interface, the MFD 12 optionally comprises an external or foreign user interface UI2 such as a keypad/display unit. Using either of these user interfaces UI1,UI2, the user U controls the MFD apparatus 12 and also enters an accounting identifier (accounting ID) in accordance with the present invention. It is not intended that the present invention be limited to any particular form of accounting ID. Instead, as used herein, the term accounting ID is intended to encompass one or more alphanumeric characters entered by a user U as a username and/or account name/number to be associated with image processing jobs carried out by the apparatus 12 in accordance with the present invention. The data resulting from the accounting capabilities of the MFD apparatus 12 as described above, and the associated accounting identifier, are together referred to herein as accounting data.

The MFD apparatus preferably also comprises means for storing all accounting data. Suitable storage means includes a mass storage device such as a disk drive and/or DRAM or nonvolatile RAM. Periodically, all accounting data is transferred via network 10 from the MFD apparatus 12 to the external accounting system EAS for processing by the external accounting system.

The external accounting system EAS, itself, is provided by a PC-based or other computerized software system that receives accounting data from the MFD apparatus 12 and processes same as programmed for purposes of preventing unauthorized use of the MFD apparatus, for tracking use of the MFD apparatus and consumables associated therewith, and/or for charging clients/accounts for use of the apparatus 12. One suitable external accounting system EAS is available commercially under the trademark EQUITRAC. The external accounting system EAS is also responsible for maintaining a database of accounting ID's as described in further detail below.

With brief reference again to FIG. 1, the administrator A interacts with the MFD apparatus 12 by either or both of two means: (i) by way of the administrator's computer workstation 16 (indicated by the arrow A1); and/or, (ii) directly with the MFD apparatus 12 by way of the user interface UI1 (indicated by the arrow A2). Likewise, the user U interacts with the MFD apparatus 12 for purposes of submitting/ receiving image processing jobs by either of two means as necessary and appropriate: (i) the network client computer workstation 18, e.g., for submission of print or computerized fax jobs (as indicated by the arrow U1); and/or, (ii) directly with the MFD apparatus 12 by way of the interface UI1 (as indicated by the arrow U2).

Figure 3:
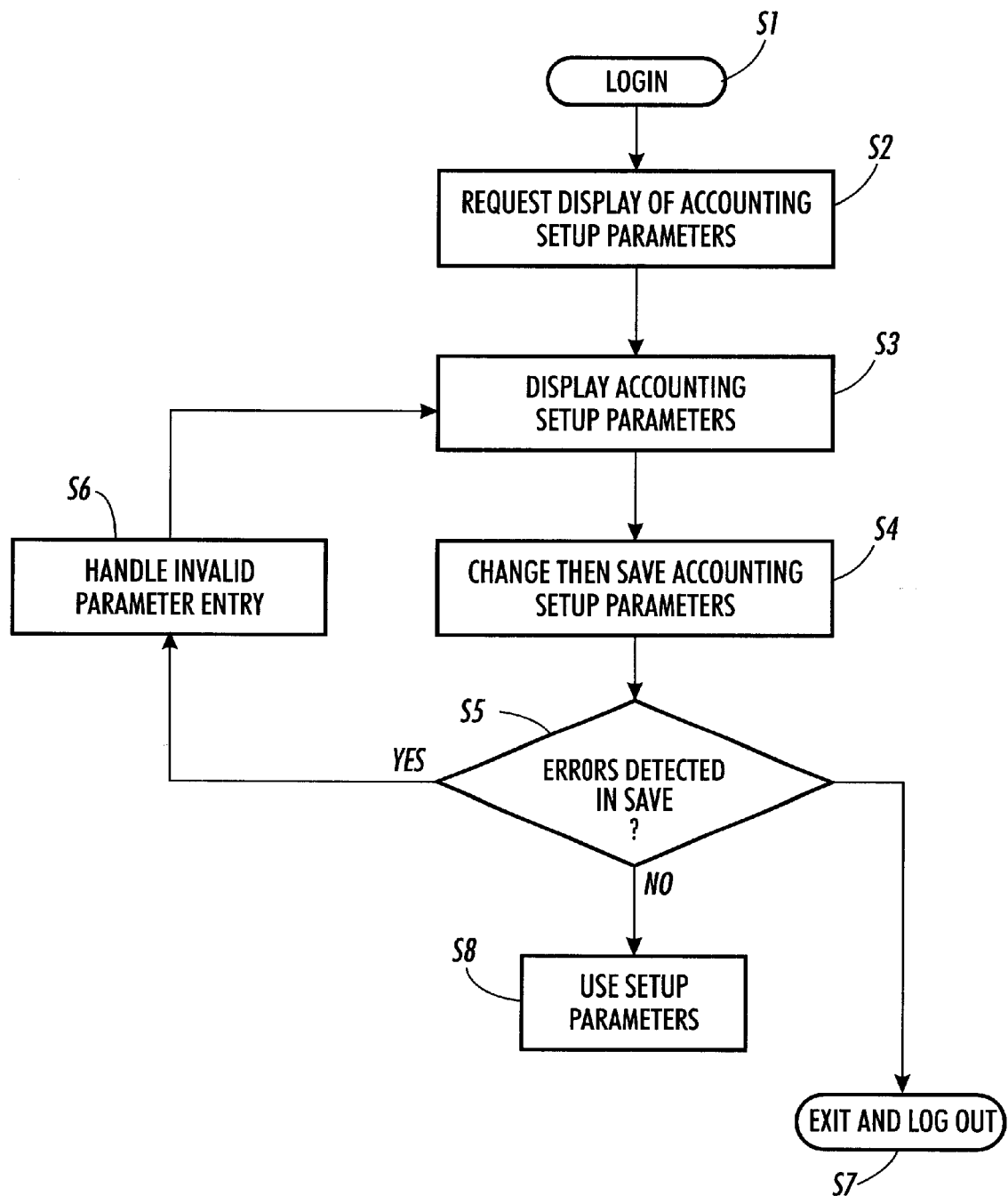
FIG. 3 is a flow chart that discloses a method by which an administrator sets job-based accounting parameters for a multifunction device in accordance with the present invention.

Job-based accounting for image processing in accordance with the present invention is preferably implemented on the above-described networked image processing system or another suitable image processing system. With reference now to FIG. 3, the method by which the administrator A sets the accounting parameters for the MFD apparatus 12 is disclosed. In steps S1 and S2, the administrator A follows a login procedure and requests accounting parameter setup procedures. In a step S3, the MFD apparatus 12 displays the accounting parameters to the administrator. In a step S4, the administrator changes the accounting parameters, as desired, and saves same. A step S5 checks to ensure that the administrator entered valid accounting parameters so that the save operation completes properly. If not, a step S6 handles the improper accounting parameter entry, e.g., by prompting the administrator A to enter new parameters, after which control returns to step S3. Otherwise, a step S7 terminates the accounting parameter setup procedure and a step S8 uses the accounting parameters to track image processing carried out by the MFD apparatus 12.

Preferably, the MFD apparatus 12 is programmed with a plurality of different pre-defined accounting modes that are selectable by the administrator A using the foregoing procedure described with reference to FIG. 3. For example, it is most preferred that the MFD apparatus 12 be programmed with at least the following accounting modes that are discussed in full detail below: (i) secure; (ii) authentication-disabled; (iii) resource; and (iv) none (i.e., no development of accounting data). In one preferred embodiment, a list of the foregoing accounting modes, and/or others, is presented to the administrator at the user interface UI1 and/or at the administrator's workstation 16 as part of the step S3 described above so that the administrator can simply select the desired mode from the list. It is also preferred that the administrator A, by the foregoing procedure, be able to program one or more custom accounting modes such as those disclosed in FIGS. 7 and 8.

Figure 4:
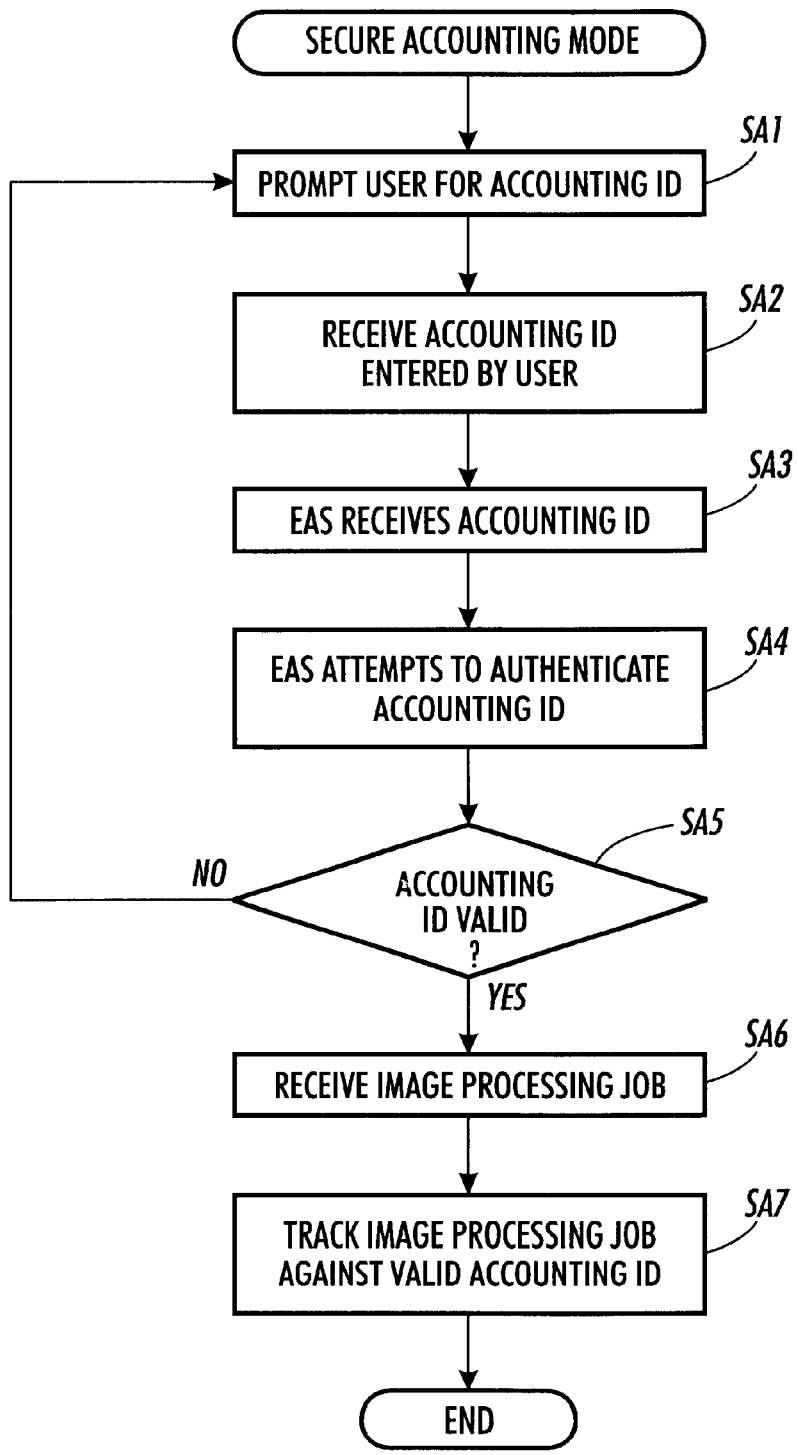
FIG. 4 is a flow chart that discloses a first, secure accounting mode for image processing in accordance with the present invention.

Referring now to FIG. 4, a preferred implementation of the first, secure accounting mode is disclosed from the viewpoint of a user U of the MFD apparatus 12. Again, it is noted that, depending upon the type of image processing job to be performed by the MFD apparatus 12, the user U interacts with the apparatus 12 by either the user interface UI1 and/or by the user's network client workstation 18. The step SA1 comprises prompting the user U to enter an accounting ID, and step SA2 comprises receiving the accounting ID entered by the user into the MFD apparatus 12. To ensure that the received accounting ID is authentic, it is sent to or otherwise received by the external accounting system EAS at step SA3 and checked against a database of authentic accounting ID's maintained by the external accounting system EAS in step SA4. The external accounting system EAS reports the results of step SA4 to the MFD apparatus 12 and, in step SA5, the MFD apparatus 12 determines if the received accounting ID is valid based upon data supplied by the external accounting system EAS. If the received accounting ID is not authentic, control passes back to step SA1 so that the user is once again prompted to enter an accounting ID (preferably with a message notifying the user that the previous accounting ID was found to be invalid). If, on the other hand, the step SA5 determines that the external accounting system EAS found the received accounting ID to be authentic, the MFD apparatus 12, in step SA6, receives the user's image processing job. A step SA7 comprises tracking the received image processing job against the received accounting ID, i.e., developing the accounting data for the image processing job as described above.

Figure 5:
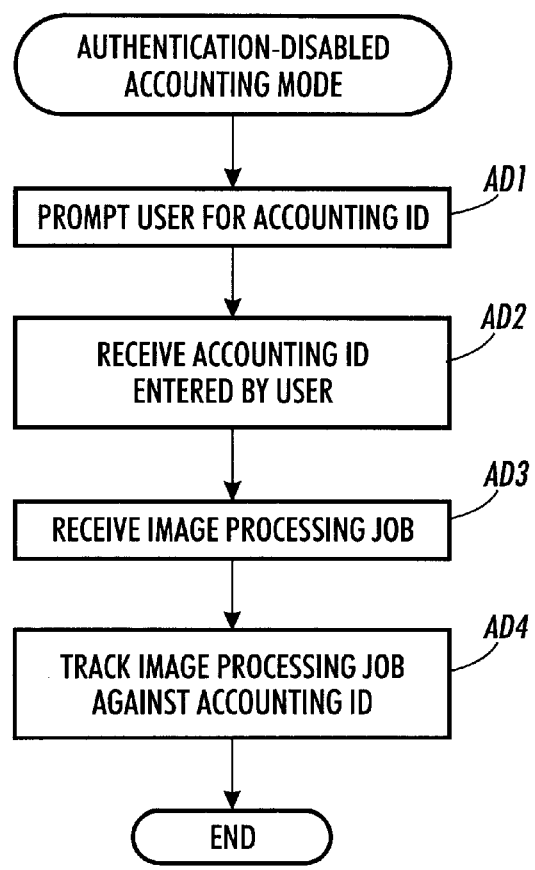
FIG. 5 is a flow chart that discloses a second, authentication-disabled accounting mode for image processing in accordance with the present invention.

Referring now to FIG. 5, the second, authentication-disabled accounting mode is disclosed. In general, the authentication-disabled accounting mode is identical to the secure accounting mode, except that the accounting ID entered by the user and received by the MFD apparatus 12 is not sent to the external accounting system EAS for authentication. Instead, it is assumed that the entered/ received accounting ID is valid. More particularly, a step AD1 comprises prompting the user U for an accounting ID. The step AD2 comprises receiving the accounting ID entered by the user. Since the received accounting ID need not be authenticated, the step AD3 is immediately carried out and comprises receiving the image processing job submitted by the user U. The step AD4 comprises tracking the received image processing job against the received accounting ID for purposes of developing the accounting data described above.

Figure 6:
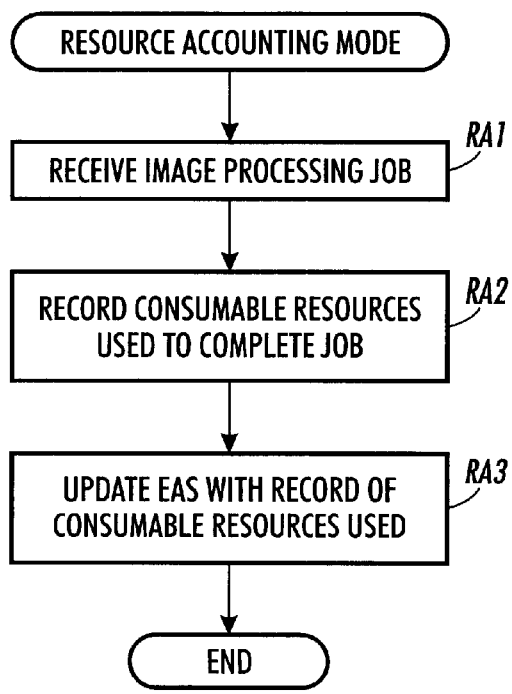
FIG. 6 is a flow chart that discloses a third, resource accounting mode for image processing in accordance with the present invention.

FIG. 6 discloses a preferred implementation of the resource accounting mode implemented by the MFD apparatus 12. The main goal of the resource accounting mode is to track use of consumables in the MFD apparatus 12, without regard to the specific user and/or account against which use of the MFD apparatus 12 is to be tracked. Thus, the step RA1 comprises receiving an image processing job, without requiring input of an accounting ID. The step RA2 comprises recording consumable resources used to complete the received image processing job (e.g., the quantity of each type of recording media used, use of color and black-and-white inks/toner, use of staples and other finishing resources, and the like). The step RA3 comprises updated the external accounting system EAS with the data generated by the step RA2 for purposes of maintaining a multi-job record in the EAS of consumables used. This information allows an administrator to monitor use of consumables in the MFD apparatus 12 and to anticipate depletion of same.

Figure 7:
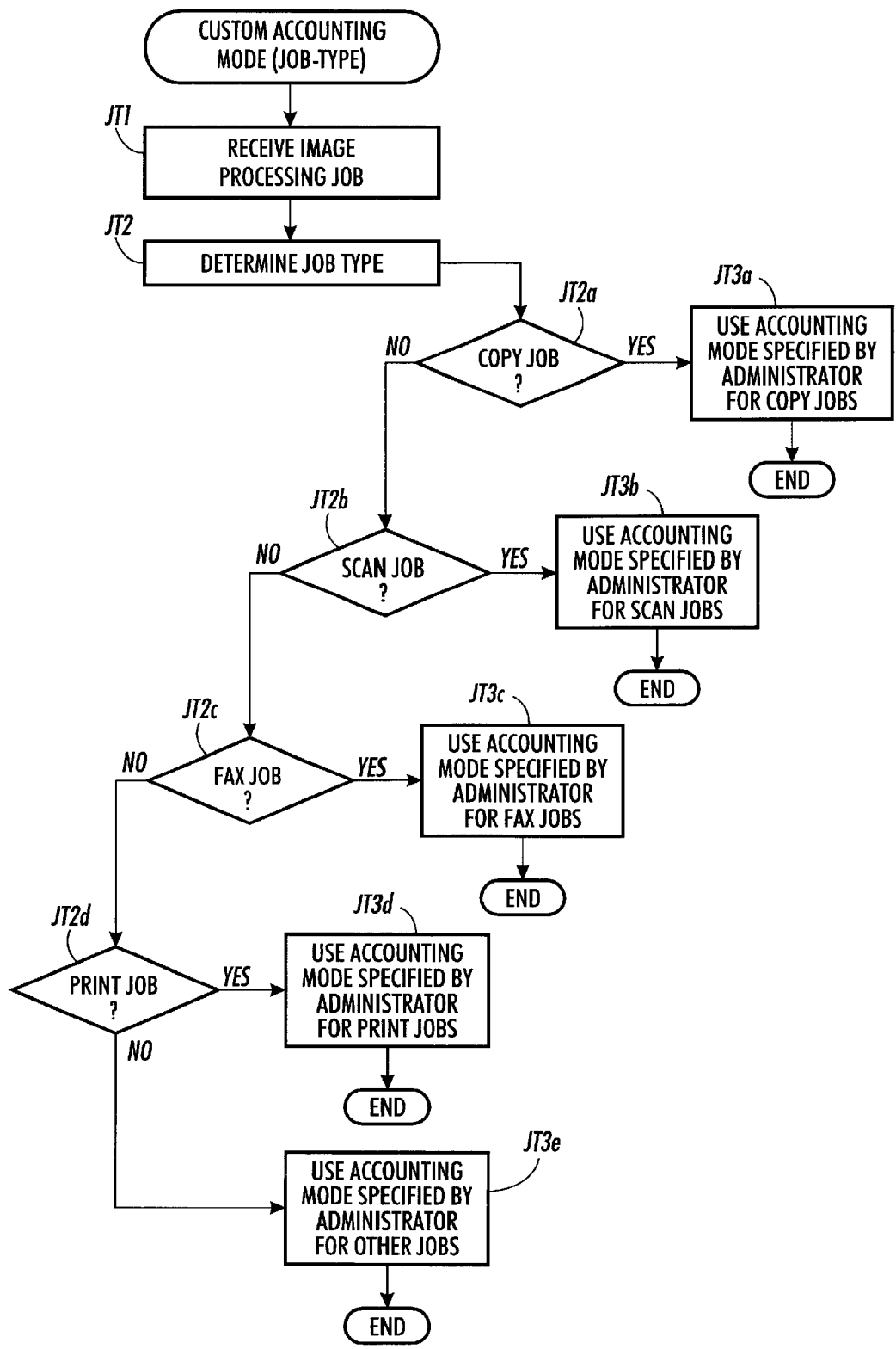
FIG. 7 is a flow chart that illustrates a fourth, custom accounting mode for image processing in accordance with the present invention.
Figure 8:
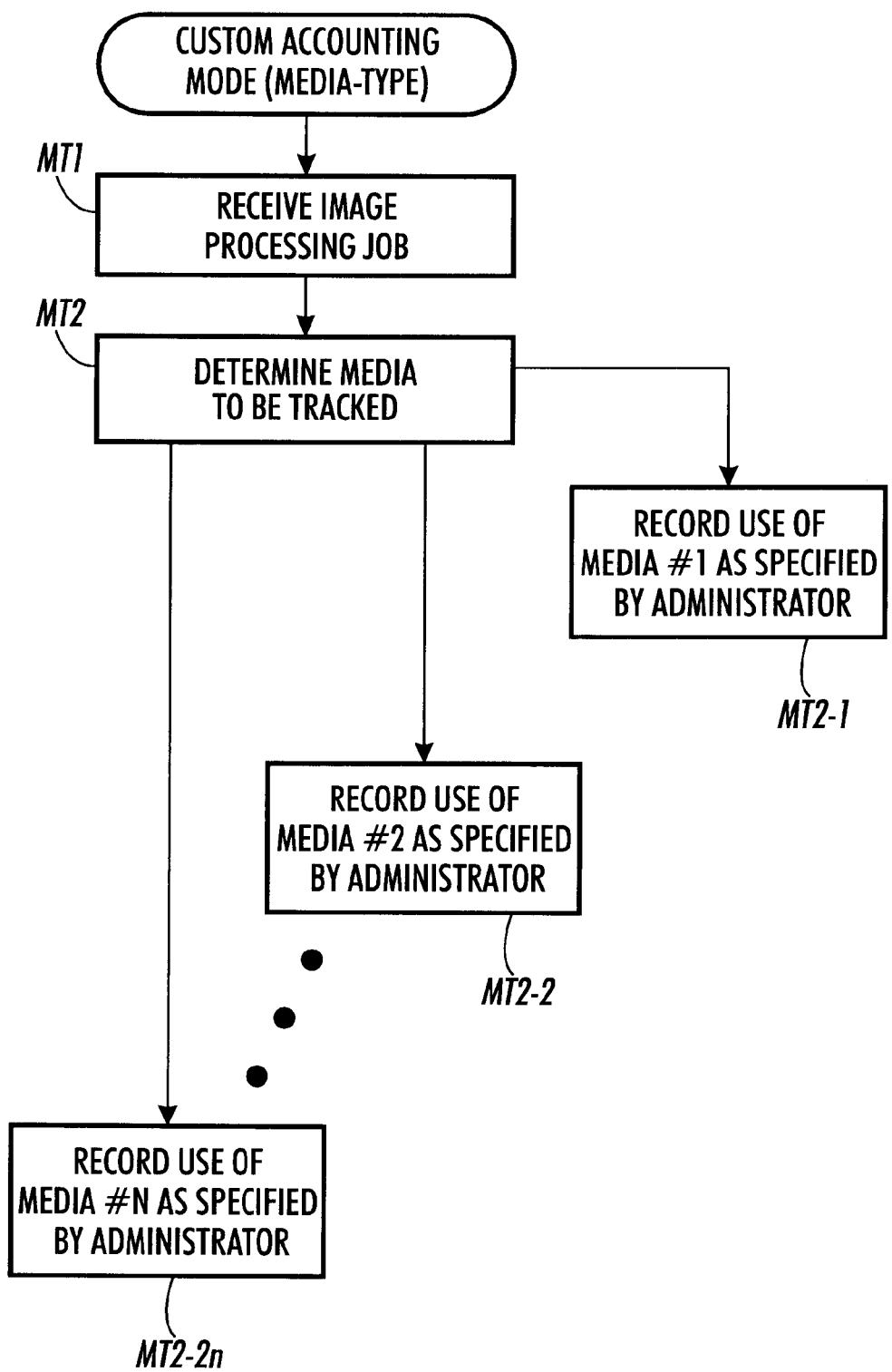
FIG. 8 is a flow chart that illustrates an alternative type of fourth, custom accounting mode for image processing in accordance with the present invention.

The MFD apparatus 12 also implements one or more custom accounting modes that are configurable by the administrator A or as requested by the administrator A to develop accounting data in a manner not possible using the secure accounting mode, the authentication-disabled mode, or the resource accounting mode. FIGS. 7 and 8 disclose two different custom accounting modes in accordance with the present invention. Of course, other custom accounting modes are possible, and it is not intended that the invention be limited to any particular custom accounting mode.

FIG. 7 discloses a job-type custom accounting mode wherein the accounting data developed in response to a received image processing job varies depending upon the type of image processing job, i.e., copy, print, scan, or fax, as specified in advance by the administrator A through the setup procedure described in relation to FIG. 3. Thus, the job-type custom accounting mode comprises a step JT1 of receiving, at the MFD apparatus 12, an image processing job from a user U. A step JT2 determines the type of job submitted by the user to the MFD apparatus 12, i.e., the step JT2 determines if the image processing job submitted by the user U is a copy job, a print job, a scan job, or a fax job. The step JT2 comprises substeps JT2a–JT2d. The substep JT2a determines if the submitted job is a copy job and, if so, a step JT3a sets the accounting mode for the submitted job to that specified by the administrator for copy jobs, e.g., to one of the secure, authentication-disabled, or resource accounting modes, or a disabled accounting mode.

If the substep JT2a determines that the submitted image processing job is not a copy job, the substep JT2b determines if the submitted job is a scan job and, if so, the step JT3b sets the accounting mode for the submitted job to that specified by the administrator for scan jobs, e.g., to one of the secure, authentication-disabled, resource, or disabled accounting modes.

If the substep JT2b determines that the submitted image processing job is not a scan job, the substep JT2c determines if the submitted job is a fax job. If the submitted job is a fax job, the step JT3c sets the accounting mode for the submitted job to that specified by the administrator for fax jobs. Again, by way of example only, the administrator A can specify one of the secure, authentication-disabled, resource, or disabled accounting modes for fax jobs, or can specify use of any other suitable alternative accounting mode.

If the substep JT2c determines that the submitted image processing job is not a fax job, the substep JT2d determines if the submitted job is a print job. If the submitted job is a print job, the step JT3d sets the accounting mode for the submitted job to that specified by the administrator for print jobs. Here, again, the administrator A can specify in advance one of the secure, authentication disabled, resource, or disabled accounting modes for print jobs, or can specify use of any other suitable alternative accounting mode as desired.

If the substep JT2d determines that the submitted job is not a print job, a step JT3e implements a default accounting mode such as the secure, authentication-disabled, resource, or disabled accounting modes.

FIG. 8 illustrates a media-type custom accounting mode that can be configured by the administrator A using the procedure disclosed in FIG. 3 so that accounting for certain recording media only is carried out. A step MT1 receives and processes an image processing job. Based upon prior input by the administrator A, the step MT2 determines which types of media are to be tracked. For each type of media (e.g., media #1, media #2, . . . , media #n) corresponding steps MT2-1, MT2-2, MT2-n record use of that media as specified in advance by the administrator. For example, the administrator can specify that only transparency media is to be tracked for purposes of charging a particular account (e.g., the marketing department) for same. Of course, similar custom accounting modes are contemplated for every resource of the MFD apparatus 12.

The invention has been described with reference to preferred embodiments. Modifications and alterations will occur to those of ordinary skill in the art to which the invention pertains upon reading and understanding of this specification. It is intended that the invention be construed as including all such modifications and alterations insofar as they come within the scope of the appended claims or the equivalents thereof.

Having thus described the preferred embodiments, what is claimed is:

1. A job-based accounting method for image processing comprising:

receiving an image processing job at a multifunction image processing apparatus from one of a walk-up user and a computer workstation operably connected to said image processing apparatus;

classifying said image processing job as one of: (i) a print job submitted from said computer workstation operably connected to said image processing apparatus; (ii) a copy job submitted by said walk-up user of said image processing apparatus; (iii) a scan job submitted by said walk-up user of said image processing apparatus; and (iv) a facsimile job one of submitted and received by said walk-up user of said image processing apparatus;

selecting one of a plurality of different accounting modes to be used by said multifunction device when said multifunction device implements said image processing job based upon said classification of said image processing job;

completing said image processing job and developing accounting data in accordance with said selected one of said plurality of different accounting modes.

2. The job-based accounting method as set forth in claim 1, wherein said step of selecting one of a plurality of different accounting modes comprises selecting one of:

a secure accounting mode that disables said image processing apparatus until a user inputs a valid accounting identifier against which usage of said image processing apparatus is tracked;

an authentication-disabled accounting mode that disables said image processing apparatus until a user inputs one of a valid or invalid accounting identifier against which usage of said image processing apparatus is tracked;

a resource accounting mode that tracks use of associated consumable resources in said image processing apparatus; and, a disabled accounting mode that allows unobstructed, untracked use of said image processing apparatus.

3. The job-based accounting method for image processing as set forth in claim 1, further comprising, prior to said step of receiving an image processing job:

receiving input from an administrator of said image processing apparatus, said input received from said administrator comprising data that associates each of said print job, copy job, scan job and facsimile job classifications with one of said plurality of different accounting modes.

4. The job-based accounting method as set forth in claim 3, wherein said step of receiving input from an administrator comprises receiving input from said administrator by way of at least one of a local user interface located at said image processing apparatus and a remote user interface located at an administration workstation operably connected to said image processing apparatus by a computer network.

5. The job-based accounting method as set forth in claim 1, further comprising:

sending said accounting data to a computerized external accounting system operably connected to said image processing apparatus by way of a computer network; and, recording said accounting data using said external accounting system.

6. An image processing system comprising:

a computer network;

a multifunction image processing apparatus connected to said computer network and adapted for performing a plurality of different image processing tasks including copying documents, scanning documents, faxing documents, and printing documents, said multifunction image processing apparatus comprising an accounting system adapted to track image processing jobs performed by said multifunction image processing apparatus according to a plurality of different accounting modes, wherein said plurality of different accounting modes comprise at least two of:

a secure accounting mode that disables said multifunction image processing apparatus until a user inputs a valid accounting identifier against which usage of said image processing apparatus is tracked;

an authentication-disabled accounting mode that disables said multifunction image processing apparatus until a user inputs one of a valid or invalid accounting identifier against which usage of said image processing apparatus is tracked;

a resource accounting mode that tracks use of associated consumable resources in said multifunction image processing apparatus; and, a disabled accounting mode that allows unobstructed, untracked use of said multifunction image processing apparatus;

a user interface operable connected to said multifunction image processing apparatus, said user interface adapted for receiving an accounting identifier input by a user and transmitting said received accounting identifier to said multifunction image processing apparatus;

at least one user workstation connected to said computer network, said user workstation adapted for submitting at least print jobs to said multifunction image processing apparatus; and, an external accounting system connected to said computer network, said external accounting system adapted to receive accounting data, including said accounting identifier, from said multifunction image processing apparatus for each image processing job performed by said multifunction image processing apparatus and to save said received accounting data.

7. The image processing system as set forth in claim 6, further comprising:

an administration computer workstation connected to said computer network, said administration workstation adapted for receiving input from an administrator that associates each one of said plurality of different image processing tasks with one of said plurality of different accounting modes.

8. An accounting method for image processing comprising:

receiving administrator input from an administrator that specifies a plurality of different accounting modes for a respective plurality of image processing functions performable by an image processing apparatus, wherein said plurality of different accounting modes comprise at least two of:

a secure accounting mode that disables said multifunction image processing apparatus until a user inputs a valid accounting identifier against which usage of said image processing apparatus is tracked;

an authentication-disabled accounting mode that disables said multifunction image processing apparatus until a user inputs one of a valid or invalid accounting identifier against which usage of said image processing apparatus is tracked;

a resource accounting mode that tracks use of associated consumable resources in said multifunction image processing apparatus; and, a disabled accounting mode that allows unobstructed, untracked use of said multifunction image processing apparatus;

receiving a request for an image processing function from a user of said image processing apparatus;

based upon said administrator input, selecting one of said plurality of different accounting modes associated with said request;

performing said image processing function; and, accounting for said image processing function according to said selected one of said plurality of accounting modes.

\* \* \* \* \*